(12) United States Patent
Wiegand

(10) Patent No.: US 11,976,994 B2
(45) Date of Patent: May 7, 2024

(54) SENSOR FOR DETECTING PRESSURE, FILLING LEVEL, DENSITY, TEMPERATURE, MASS AND/OR FLOW RATE INCLUDING NANOWIRES ARRANGED ON COUPLING SECTION

(71) Applicant: WIKA Alexander Wiegand SE & Co. KG, Klingenberg/Main (DE)

(72) Inventor: Alexander Wiegand, Erlenbach (DE)

(73) Assignee: WIKA ALEXANDER WIEGAND SE & CO. KG, Klingenberg/Main (DE)

( * ) Notice: Subject to any disclaimer, the term of this patent is extended or adjusted under 35 U.S.C. 154(b) by 338 days.

(21) Appl. No.: 17/500,686

(22) Filed: Oct. 13, 2021

(65) Prior Publication Data

US 2022/0042867 A1 Feb. 10, 2022

Related U.S. Application Data

(63) Continuation of application No. PCT/EP2020/060445, filed on Apr. 14, 2020.

(30) Foreign Application Priority Data

Apr. 15, 2019 (DE) .................... 10 2019 109 947.1

(51) Int. Cl.
| | | |
|---|---|---|
| *G01L 9/00* | (2006.01) | |
| *G01F 1/34* | (2006.01) | |
| *G01F 23/18* | (2006.01) | |
| *G01K 7/18* | (2006.01) | |
| *G01K 7/34* | (2006.01) | |
| *G01L 19/00* | (2006.01) | |
| *G01L 19/14* | (2006.01) | |
| *G01N 9/26* | (2006.01) | |

(52) U.S. Cl.
CPC .............. *G01L 9/0051* (2013.01); *G01F 1/34* (2013.01); *G01F 23/18* (2013.01); *G01K 7/18* (2013.01); *G01K 7/34* (2013.01); *G01L 9/0075* (2013.01); *G01L 19/0061* (2013.01); *G01L 19/147* (2013.01); *G01N 9/26* (2013.01)

(58) Field of Classification Search
None
See application file for complete search history.

(56) References Cited

U.S. PATENT DOCUMENTS

| | | | | |
|---|---|---|---|---|
| 5,481,905 | A * | 1/1996 | Pratt | ....................... G01P 15/12 |
| | | | | 73/900 |
| 2009/0212093 | A1 | 8/2009 | Bentley et al. | |
| 2011/0031566 | A1 | 2/2011 | Kim et al. | |

(Continued)

FOREIGN PATENT DOCUMENTS

JP 2017163085 A 9/2017

OTHER PUBLICATIONS

International Search Report dated Jul. 8, 2020 in corresponding application PCT/EP2020/060445.

*Primary Examiner* — Brandi N Hopkins
*Assistant Examiner* — Nigel H Plumb
(74) *Attorney, Agent, or Firm* — Muncy, Geissler, Olds & Lowe, P.C.

(57) ABSTRACT

A sensor for detecting pressure, filling level, density, temperature, mass and/or flow rate, wherein at least one central sensor component is coupled to a further component by nanowires and wherein the sensor component is stiffened, fixed and/or electrically contacted this way.

22 Claims, 4 Drawing Sheets

(56) References Cited

U.S. PATENT DOCUMENTS

| | | | |
|---|---|---|---|
| 2013/0053711 A1* | 2/2013 | Kotlanka | A61B 5/02007 |
| | | | 600/505 |
| 2019/0041286 A1* | 2/2019 | Robert | G01L 19/143 |
| 2019/0162614 A1* | 5/2019 | Li | G01L 9/0044 |

* cited by examiner

SENSOR FOR DETECTING PRESSURE, FILLING LEVEL, DENSITY, TEMPERATURE, MASS AND/OR FLOW RATE INCLUDING NANOWIRES ARRANGED ON COUPLING SECTION

This nonprovisional application is a continuation of International Application No. PCT/EP2020/060445, which was filed on Apr. 14, 2020, and which claims priority to German Patent Application No. 10 2019 109 947.1, which was filed in Germany on Apr. 15, 2019, and which are both herein incorporated by reference.

BACKGROUND OF THE INVENTION

Field of the Invention

The present invention relates to a sensor for a detecting pressure, a filling level, a density, a temperature, a mass and/or a flow rate.

Description of the Background Art

Sensors for detecting pressure, filling level, density, temperature, mass or flow rate are generally known in the art.

SUMMARY OF THE INVENTION

It is therefore an object of the present invention to provide a sensor for detecting the pressure, filling level, density, temperature, mass and/or flow rate which is improved over the art.

According to an exemplary embodiment of the invention, the sensor for detecting pressure, filling level, density, temperature, mass and/or flow rate comprises a sensor component for detecting a physical quantity of pressure, filling level, density, temperature, mass and/or flow rate. The sensor component comprises a thin section sensitive to deflection being provided with an electronic analysis device on a side facing away from a process medium, i.e. a side configured as an arrangement facing away from the process medium during operation of the sensor component, and wherein, upon subjection to pressure on a side facing toward the process medium configured as an arrangement facing the process medium during operation of the sensor component, an elastic deflection occurs toward the side facing away from the process medium. This deflection is electronically detectable by the analysis device. Herein, the section sensitive to deflection is at least primarily located in a central area of the sensor component. Furthermore, the sensor component comprises a coupling section extending circumferentially about the section sensitive to deflection and configured to be coupled to at least one further component on one side or on both sides. During the coupling, the coupling section is at least partially stiffened, fixed or contacted by the further component. For the coupling, nanowires are arranged at least in sections on the coupling section of the sensor component and/or on the further component.

Thus, the sensor has a design in which a sensor part or a sensor component is coupled to a second component by the nanowires. Herein, the nanowires permanently fix the two components to one another. In addition, this connection is electrically conductive and furthermore pressure-tight, so that in particular a pressure-tight connection toward a process port or sensor carrier part may be established. Such a connection by nanowires may be implemented in a particularly easy and reliable way.

The nanowires can be applied on one side or on both sides directly on the coupling section or on a coupling section of the further component or strip-like as an intermediate joining layer. Nanowires applied in this way allow for a particularly stable connection. In the case of a one-sided application, a better grip in the surface of the respective other component, which may for example be cleaned and/or napped, results upon compression.

The further component can be a sensor carrier part facing the process medium when in operation, the sensor carrier part in particular comprising a process access with a thread for a sealing insertion into a process opening, wherein an end of the process access facing away from the process opening is closed by the sensor component. Such a design allows for a simple, safe and media-tight arrangement of the sensor at a facility or a process.

The section sensitive to deflection and the circumferential coupling section can form a sensor disk reinforced by a completely circumferential circular section. Thus, the sensor disk is particularly stable mechanically and at the same time configured for an accurate and sensitive detection.

The sensor component can have nanowires on both sides in the area of the coupling section and is arranged between the sensor carrier part and a further disk-like component as a sandwich composite and thus configured in a particularly compact and mechanically stable way.

The sensor carrier part can be made of, for example, brass, stainless steel or an alloy, and the sensor component can be made of ceramics or a silicon oxide ceramics. Such a combination of materials allows for a simple and reliable connection between the sensor carrier part and the sensor component by nanowires.

A nanowire connection to the sensor carrier part can comprises a fixing and/or sealing and/or electrically contacting function. By means of the nanowire connection, the sensor carrier part may be adapted to requirements of a respective application in a particularly easy and reliable way.

The section sensitive to deflection can comprise a first electrically conductive layer, and a disk-like second component configured as a sensor top part comprises a second electrically conductive layer, wherein a deflection and/or expansion of the section sensitive to deflection is detectible in a capacitive way at the two electrically conductive layers. Such a capacitive detection is particularly reliable, accurate and robust.

The section sensitive to deflection can be at least in sections provided with an electrical resistor layer and/or strain gauge resistors, and a deflection and/or expansion or a temperature present there are/is detectible in a resistive way. A resistive detection is also particularly reliable, accurate and robust.

The sensor carrier part can be configured as a coupled second disk-like component and carries a printed circuit board comprising electronic components for an electronic analysis of the deflection and/or expansion, wherein the nanowires cause an electric contacting and a mechanical fixing of the sensor component and the sensor carrier part through the coupling section. Such a design is very compact so the sensor design may be particularly low size. Herein, the fixing and contacting by means of the nanowires is very reliable, robust and easy to set up.

A further component can carry a printed circuit board, and electronic components arranged thereon are fixed and contacted by the nanowires. This embodiment also allows for an extremely compact design of the sensor. Herein, the fixing and contacting by means of the nanowires is very reliable, robust and easy to set up.

The sensor carrier part and/or a disk-like second component can be configured as a sensor top part are/is provided with electrically conductive layers which have a circular, punctiform, ring-like, semi-circular or segment-like shape. These layers are provided for capacitive detection of the deflection and/or expansion of the section sensitive to deflection, wherein a choice of the respective shape is made depending on an application of the sensor and is thus adaptable exactly to the requirements of the application.

The section sensitive to deflection can be located in a center of the sensor component and has a thickness of 0.1 mm to 0.8 mm. A thickness within this range results in a particularly high stability of the section sensitive to deflection with very good flexibility at the same time.

The nanowires can be applied on one side or on both sides and are made of copper, tin, silver, nickel, gold or stainless steel. Such a configuration allows for a simple and reliable connection between the sensor carrier part and the sensor component by means of the nanowires, in particular if the sensor carrier part is made of brass, stainless steel or an alloy, and the sensor component is made of ceramics or silicon oxide ceramics.

A molded second connection can be provided for measuring a differential pressure. Herein, this connection in particular allows for accessing the interior of the sensor at a side of the sensor component facing away from the process access and thus for measuring a differential pressure of between both sides of the sensor component. For example, through the differential pressure a flow rate may also be detected as a measure at a pipe collimator.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In FIGS. 1A to 1F, schematic views of a carrier part 32 during a production of nanowires 28 on the carrier part 32 are shown in different production stages as known in the art.

Herein, the term nanowire 28 used in the following may also refer to an aggregation of multiple fibers.

Figure 1A:
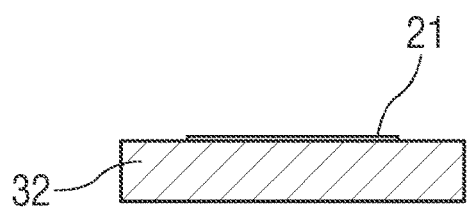
FIGS. 1A to 1F are schematic views of a carrier part during production of nanowires thereon in different production stages.

Herein, according to FIG. 1A, a so called target 21 is initially applied on the carrier part 32.

Figure 1B:
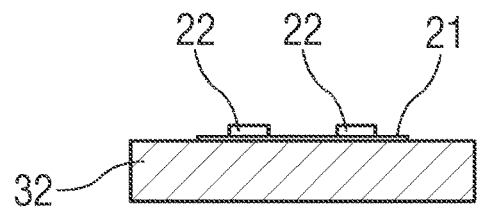

Subsequently, according to FIG. 1B, structures 22 are applied onto the target 21 in a lithographic process.

Figure 1C:
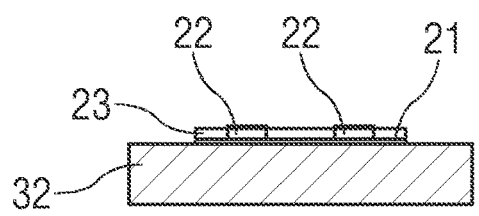

Subsequently, according to FIG. 1C, a start layer 23 is applied, on which the nanowires 28 are produced.

Figure 1D:
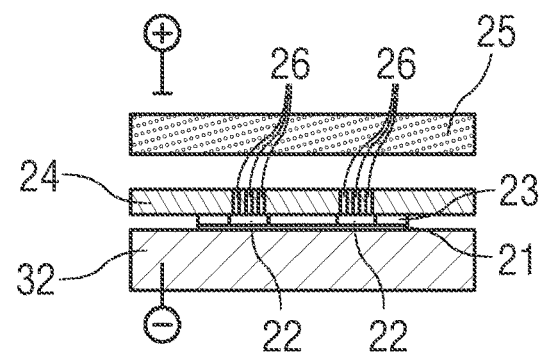

According to FIG. 1D, a structure layer 24, e.g. in the form of a film, having recesses 26, is applied onto this start layer 23, wherein an electrolyte 25 is applied on the structure layer 24, e.g. by means of a sponge.

For example, the recesses 26 have a cylindric shape with a diameter from 0.5 μm to 3 μm.

Upon application of a voltage, a nanowire structure is produced in the recesses 26.

Figure 1E:
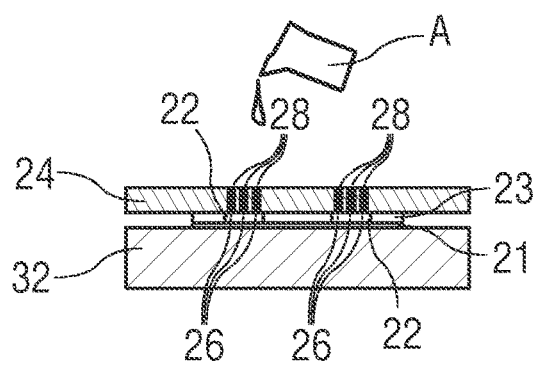
Figure 1F:
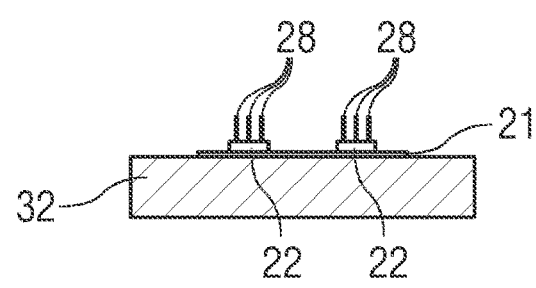

Subsequently, according to FIG. 1E, the structure layer 24 is removed, e.g. by means of an acid A, such that the nanowires 28 are exposed as shown in FIG. 1F.

For further processing, the nanowires 28 may for example be covered for protection against external interference.

Such a technique is generally also described in the publications US 2011/0039459 or US 2016/0143153.

Figure 2:
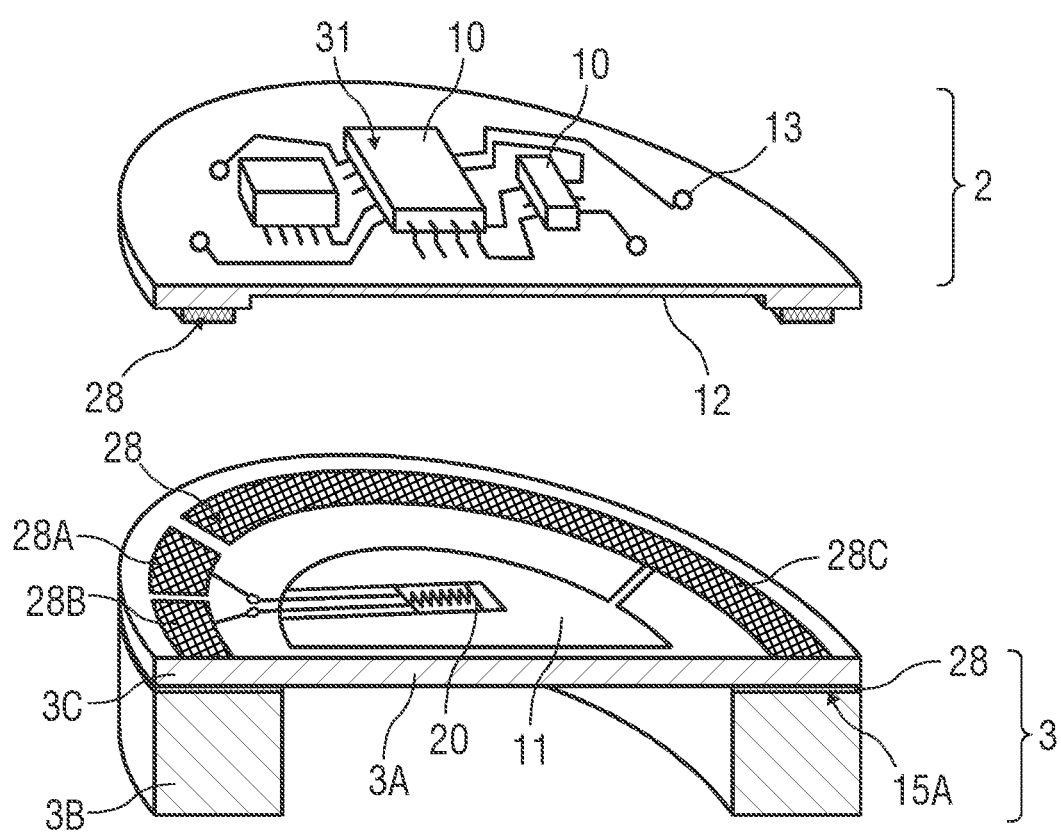
FIG. 2 is a schematic perspective half-sectional view of a sensor component and a second disk-like component removed therefrom.

FIG. 2 is a perspective half-sectional view of a possible embodiment of a sensor component 3 and a possible embodiment of a second disk-like component 2, also referred to as a sensor top part, removed from the sensor component 3.

Herein, the sensor component 3 is in particular configured for detecting pressure; however, it may also detect another physical quantity such as filling level, density, temperature, mass and/or flow rate.

For this purpose, the sensor component 3 comprises a thin section 3A sensitive to deflection. When being subjected to pressure, this section 3A cambers, wherein a maximum of the camber is in particular in the center thereof. Herein, the section 3A sensitive to deflection in particular deflects toward the side facing away from a process medium.

This side facing away from the process is provided with an electronic analysis device 11. This analysis device 11 may for example be a (first) electrically conductive layer 11 approaching another layer 12 of the second, in particularly disk-shaped, component 2 when cambering. As this happens, in particular a capacity between the two layers or surfaces is changing. This change may be measured and may then be used as a signal for the pressure and for the cambering.

The subjection to pressure occurs for example in a low pressure range from 25 mbar to 100 bar. Herein, the section 3A sensitive to deflection, also referred to as a membrane, is for example made of a ceramic material having a thickness from 0.1 mm to 0.8 mm. Likewise, metallic membranes are perceivable which may for example be subjected to pressures up to 8000 bar.

An elastic deflection of the central section 3A sensitive to deflection may be measured by an analysis circuit 31 through a change of the capacity or likewise through a change of an electric resistance, if resistors, e.g. strain gauge resistors, in particular strip-shaped, and/or a resistor layer 20 are applied on the section 3A sensitive to deflection.

The section 3A sensitive to deflection is in particular located in a central area of the sensor component 3 which is shown being round here. The sensor component 3 may likewise have any other shape, e.g. a cuboid or a cube.

A coupling section 3C extends around the section 3A sensitive to deflection, i.e. the membrane, in particular circumferentially, resulting in a disk having the section 3A sensitive to deflection in the interior. For example, the outer area is stiffened on at least one side herein so that it does not move or deflect when being subjected to pressure. Part of.

On the one hand, the stiffening may be achieved by a pipe section or a completely circumferential ring section 3B which is coupled to the coupling section 3C. The connection between the ring section 3B and the coupling section 3C is for example established by a nanowire layer 15A.

On the other hand, the stiffening at the coupling section 3C may be brought about by adding the disk-like second component 2 from above. Herein, the second component 2 may comprise the second plane electrode for the capacitive measurement.

During the coupling, the sensor composite, in particular the section 3A sensitive to deflection, i.e. the disk-shaped membrane, is provided with nanowires 28 in the coupling section 3C and for example compacted with the second component 2. This way, a coupling and a fixing and at the same time a stiffening at the edge of the section 3A sensitive to deflection result.

Herein, the nanowires 28 are for example circumferentially applied on the coupling section 3C, or in the alternative only section-wise in the sections 28A, 28B, 28C. Herein, a holding force is for example up to 5 MPa to 50 MPa, for example 10 MPa to 30 MPa. Herein, the nanowires 28 have a thickness from 0.3 µm to 4.0 µm with a length from e.g. 10 µm to 800 µm.

The nanowires 28 are applied on one side or on both sides directly on the coupling section 3C of the sensor component 3 or on a coupling section of the second component 2. In the alternative, the application may be made strip-like as an intermediate joining layer and/or as a ring belt.

In the case of a one-sided application, a grip in the surface of the respective other component results upon compression of the sensor component 3 and the second component 2. In order to optimize this grip, the surface may for example be cleaned and/or napped prior to this.

In a possible embodiment, the disk-like second component 2 is arranged as a printed circuit board or comprises a printed circuit board, thereby carrying electronic components 10 of the analysis circuit 31, conducting paths and/or contact points 13. Herein, the components 10 may likewise be mounted through nanowire connections.

Figure 3:
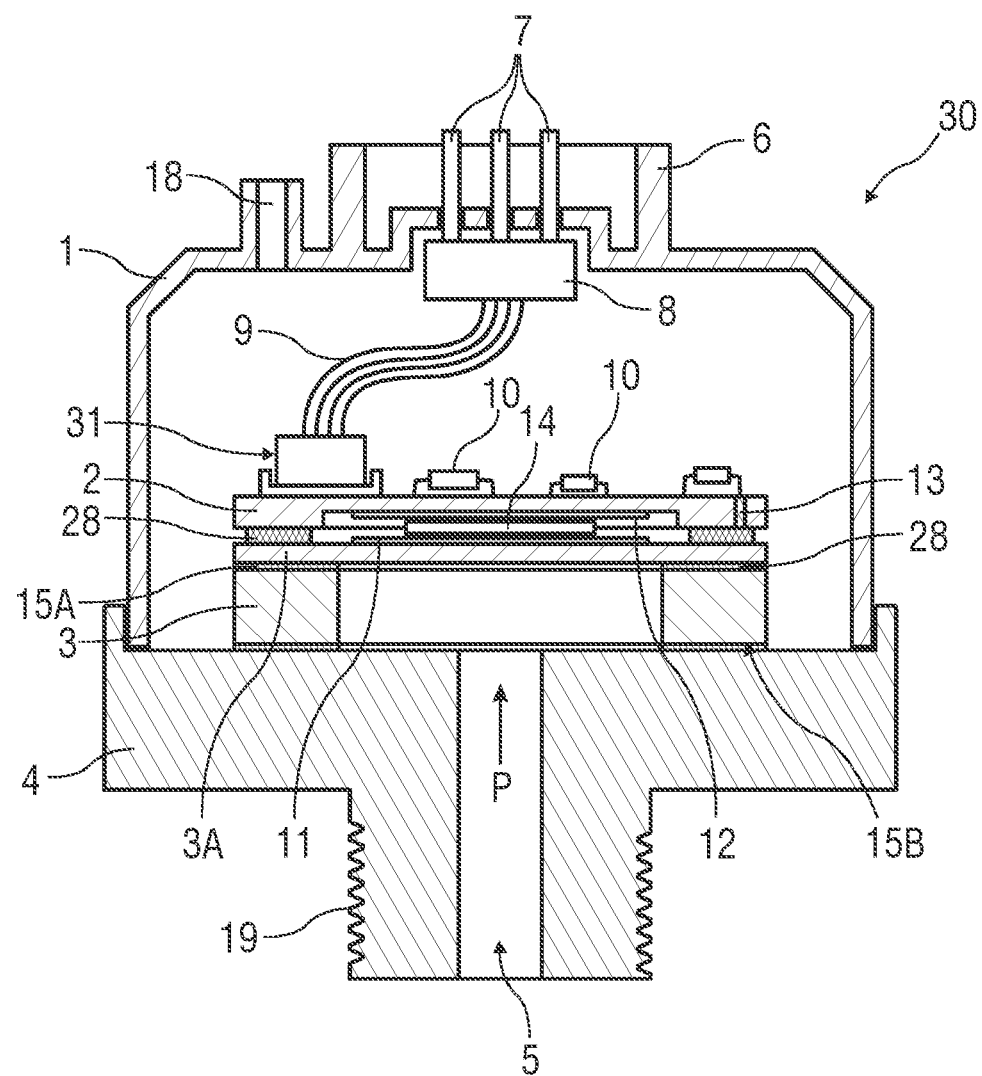
FIG. 3 is a schematic sectional view of a sensor for detecting pressure, filling level, density, temperature, mass and/or flow rate.
Figure 4A:
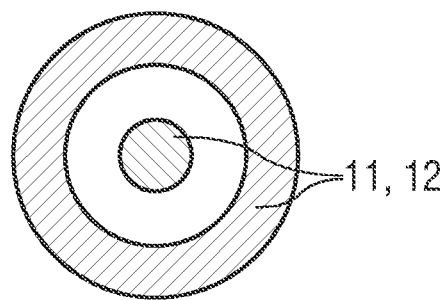
FIGS. 4A to 4D are schematic top views of distinctly shaped electrically conductive layers.
Figure 4B:
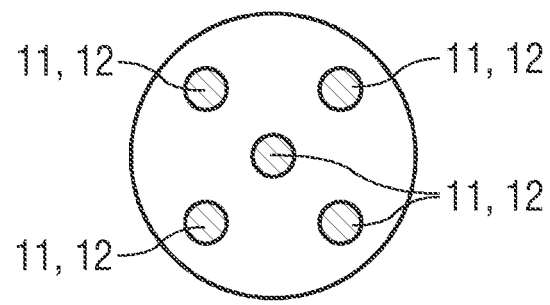
Figure 4C:
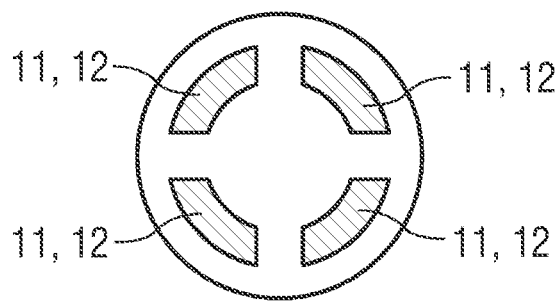
Figure 4D:
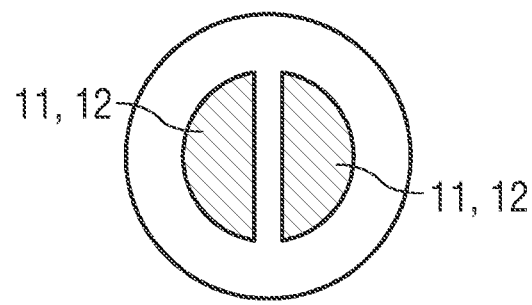

FIG. 3 is a sectional view of a possible embodiment of a sensor 30.

The sensor 30 comprises a housing 1, a sensor component 3, e.g. configured according to the illustration in FIG. 2, a disk-like second component 2, e.g. configured according to the illustration in FIG. 2, and a further component 4 configured as a sensor carrier part 4.

Herein, the sensor component 3 and the disk-like second component 2 mounted thereon are arranged on the sensor carrier part 4, wherein the sensor carrier part 4 faces a process in the mounted state.

The sensor carrier part 4 comprises a process access 5 having a thread 19. By means of the thread 19, the sensor carrier part 4 may be inserted into a process opening in a sealing manner. Herein, an end of the process access 5 facing away from the process opening is closed by the sensor component 3.

The sensor carrier part 4 is for example made of brass and the sensor component 3 is arranged on the sensor carrier part 4 in a sealing manner by a circular nanowire layer 15B. The sensor component 3 having the section 3A sensitive to deflection and the circumferential coupling section 3C is hence not only reinforced by the completely circumferential circular section 3B but also additionally stabilized by the coupling to the sensor carrier part 4.

In particular, the sensor component 3 may have nanowire layers 15A, 15B on both sides in the area of the coupling section 3C, and so the downward stiffening toward the ring section 3B and the upward stiffening as a sandwich composite may carry the second disk-like component 2. In this setup, nanowires 28 are for example applied on the coupling section 3C on both sides.

Deviating from the configuration in which the sensor carrier part 4 is made of brass, it may also be made of stainless steel or of any other suitable metallic material or of any other suitable metallic alloy to be connected via nanowires 28 to the sensor component 3 which may for example be formed from ceramics or silicon oxide ceramics. Herein, the nanowires 28 may be made of copper, tin or stainless steel.

When connected in the sandwich composite to the second upper disk-like component 2, the nanowire connection to the sensor component 3 optionally forms an electrical connection in addition to the fixing and/or sealing effect in order to electrically connect the capacitive layers or the electrical resistances, e.g. strain gauge resistors, to the analysis circuit 31.

For example, the section 3A sensitive to deflection is provided with a first electrically conductive layer 11 and the second disk-like component 2 is provided with a second electrically conductive layer 12 for this purpose. In case of deflection, expansion of the central section 3A sensitive to deflection, a change of pressure or camber may then be detected through the two electrically conductive layers 11, 12 in a capacitive way.

In a possible embodiment, an intermediate layer 14 or a liquid is provided as a dielectric to improve the capacitive effect. Likewise it is possible to provide the layers 11, 12 with special nanowires 28 in a certain distance and that the layers 11, 12 engage each other like fingers in order to likewise metrologically improve the capacitive effect this way.

In a possible embodiment, for this purpose, the disk-like second element comprises contact points 13 to the electronic components 10 of the analysis circuit 31, the contact points 13 configured as plated-through holes. These plated-through holes may thus connect one side to the other or contact components of the analysis circuit 31 directly through nanowires 28 so that these components of the analysis circuit 31 get contacted to one of the conductive layers 11, 12 of the capacitive sensor circuit.

A plug 6 is led out of housing 1 enclosing the sensor component 3 and the second component 2. Herein, contacts 7 of the plug 6 may also be connected to a plug or on a base plate 8 inside, the base plate 8 being connected to the analysis circuit 31 through a multi-conductor cable 9.

Moreover, access to the interior of the sensor 30 and to the other side of the sensor component 3 for measuring a differential pressure is possible through a connection 18 formed to the housing 1. For example, the flow rate may thus also be detected as a measure through the differential pressure at a pipe collimator.

FIGS. 4A to 4D show top views of electrically conductive layers 11, 12 for the capacitive measurement.

These layers 11, 12 may have a planar circular, punctiform, ring-like, semi-circular or segment-like shape.

The invention is not limited to the above described detailed embodiments. The invention may be modified within the scope of the following claims. Likewise, individual aspects from the dependent claims may be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor for detecting one or more of a pressure, a filling level, a density, a temperature, a mass or a flow rate, the sensor comprising:
    a sensor component configured to detect a physical quantity of one or more of the pressure, the filling level, the density, the temperature, the mass or the flow rate, the sensor component having a thin section sensitive to deflection, wherein the section sensitive to deflection is provided with an electronic analysis device on a side facing away from a process medium and wherein, upon subjection to pressure on a side facing toward the process medium, an elastic deflection occurs toward the side facing away from the process medium, wherein the analysis device is configured to electronically detect the elastic deflection, and wherein the section sensitive to deflection is at least primarily located in a central area of the sensor component;
    a coupling section extending circumferentially about the section sensitive to deflection and being configured to be coupled to at least one further component, wherein the coupling section is one of stiffened, fixed and contacted at least in part by the further component during the coupling;
    nanowires arranged at least in sections on at least one of the coupling section of the sensor component and the further component for the coupling; and
    nanowire layers disposed on both sides of the sensor component in an area of the coupling section,
    wherein the at least one further components is a sensor carrier part facing the process medium when in operation,
    wherein the sensor carrier part has a process access with a thread for a sealing insertion into a process opening, and
    wherein an end of the process access facing away from the process opening is closed by the sensor component.

2. The sensor according to claim 1, wherein the nanowires are applied on at least one of two sides directly on one of the coupling section of the sensor component and a coupling section of the further component.

3. The sensor according to claim 1, wherein the nanowires are applied on at least one of two sides in a strip-like way as an intermediate joining layer.

4. The sensor according to claim 1, wherein the section sensitive to deflection and the circumferential coupling section form a sensor disk reinforced by a completely circumferential circular section.

5. The sensor according to claim 1, wherein the sensor component has nanowires on both sides in an area of the coupling section and is arranged between the sensor carrier part and a further disk-like component as a sandwich composite.

6. The sensor according to claim 1, wherein the sensor carrier part is made of brass, stainless steel or an alloy, and the sensor component is made of ceramics or silicon oxide ceramics.

7. The sensor according to claim 1, further comprising a nanowire connection to the sensor carrier part comprising at least one of a fixing, a sealing, or an electrically contacting function.

8. The sensor according to claim 1, wherein the section sensitive to deflection comprises a first electrically conductive layer, wherein the at least one further component comprises a disk-like second component configured as a sensor top part comprising a second electrically conductive layer, wherein at least one of a deflection or an expansion of the section sensitive to deflection is detectible in a capacitive way at the first and second electrically conductive layers.

9. The sensor according to claim 1, wherein the section sensitive to deflection is at least in sections provided with at least one of an electrical resistor layer and strain gauge resistors, and
    wherein at least one of a deflection or an expansion or a temperature present at the at least one of an electrical resistor layer and strain gauge resistors is detectible in a resistive way.

10. The sensor according to claim 5, wherein the sensor carrier part carries a printed circuit board comprising electronic components for an electronic analysis of the one of deflection and expansion, and
    wherein the nanowires cause an electric contacting and a mechanical fixing of the sensor component and the sensor carrier part through the coupling section.

11. The sensor according to claim 1, wherein at least one of the at least one further components carries a printed circuit board with electronic components arranged thereon, which are fixed and contacted by the nanowires.

12. The sensor according to claim 1, wherein at least one of the sensor component and a disk-like second component configured as a sensor top part is provided with electrically conductive layers which have a circular, punctiform, ring-like, semi-circular or segment-like shape.

13. The sensor according to claim 1, wherein the section sensitive to deflection is located in a center of the sensor component and has a thickness of 0.1 rnm to 0.8 mm.

14. The sensor according to claim 1, wherein the nanowires are applied on at least one of two sides and are made of one of copper, tin, silver, nickel, gold or stainless steel.

15. The sensor according to claim 1, wherein a molded connection is provided for measuring a differential pressure.

16. The sensor according to claim 1, wherein the nanowires comprise an aggregation of multiple fibers.

17. The sensor according to claim 1, where the coupling section comprises an outer area stiffened on at least one side such that the outer area does not deflect when subjected to pressure.

18. The sensor according to claim 1, further comprising a disk-like component coupled to the sensor component.

19. The sensor according to claim 18, further comprising an intermediate layer disposed between the sensor component and the disk-like component.

20. A sensor, comprising:
    a sensor component configured to detect a physical quantity, the sensor component having a thin section sensitive to deflection located in a central area of the sensor component, wherein the section sensitive to deflection is provided with an electronic analysis device on a side facing away from a process medium and wherein, upon subjection to pressure on a side facing toward the process medium, an elastic deflection occurs toward the side facing away from the process medium, wherein the analysis device is configured to electronically detect the elastic deflection;
    a sensor carrier part;
    a coupling section extending circumferentially about the section sensitive to deflection and being configured to be coupled to the sensor carrier part;

nanowires arranged on the coupling section of the sensor component or the sensor carrier part; and nanowire layers disposed on a first side and a second side of the sensor component in an area of the coupling section.

21. The sensor according to claim 20, wherein the sensor is configured to detect pressure.

22. A sensor for detecting one or more of a pressure, a filling level, a density, a temperature, a mass or a flow rate, the sensor comprising:

a sensor component configured to detect a physical quantity of one or more of the pressure, the filling level, the density, the temperature, the mass or the flow rate, the sensor component having a thin section sensitive to deflection, wherein the section sensitive to deflection is provided with an electronic analysis device on a side facing away from a process medium and wherein, upon subjection to pressure on a side facing toward the process medium, an elastic deflection occurs toward the side facing away from the process medium, wherein the analysis device is configured to electronically detect the elastic deflection, and wherein the section sensitive to deflection is at least primarily located in a central area of the sensor component;

a coupling section extending circumferentially about the section sensitive to deflection and being configured to be coupled to at least one further component, wherein the coupling section is one of stiffened, fixed and contacted at least in part by the further component during the coupling;

nanowires arranged at least in sections on at least one of the coupling section of the sensor component and the further component for the coupling; and nanowire layers on both sides in an area of the coupling section.

* * * * *